United States Patent [19]
Erichsen et al.

[11] Patent Number: 5,317,923
[45] Date of Patent: Jun. 7, 1994

[54] PRESSURE TRANSDUCERS

[75] Inventors: Herman W. Erichsen, Holliston; Louis J. Panagotopulos, Walpole, both of Mass.; Mark Levine, Plainview, N.Y.; William T. Holmes, Jackson, N.J.

[73] Assignee: General Automotive Specialty, Co., Inc., North Brunswick, N.J.

[21] Appl. No.: 972,118

[22] Filed: Nov. 5, 1992

Related U.S. Application Data

[60] Division of Ser. No. 802,011, Dec. 3, 1991, Pat. No. 5,174,014, which is a continuation of Ser. No. 558,764, Jul. 27, 1990, abandoned.

[51] Int. Cl.$^5$ .................. G01L 7/08; G01L 9/06
[52] U.S. Cl. .......................... 73/727; 73/777; 338/4
[58] Field of Search ............ 73/777, 862.632, 862.634, 73/862.637, 862.638, 727, 721; 338/4, 42; 29/621.1

[56] References Cited

U.S. PATENT DOCUMENTS

| | | | |
|---|---|---|---|
| 3,935,636 | 2/1976 | Mermelstein | 29/619 |
| 4,410,871 | 10/1983 | Mallon | 338/5 |
| 4,442,717 | 4/1984 | Kurtz | 73/766 |
| 4,574,640 | 3/1986 | Krechmery | 73/721 |
| 4,576,052 | 3/1986 | Sugiyama | 73/862.63 |
| 4,683,755 | 8/1987 | Samek | 73/727 |
| 4,737,473 | 4/1988 | Wilner | 437/154 |
| 4,793,194 | 12/1988 | Wilner | 73/862.67 |
| 5,174,014 | 12/1992 | Erichsen et al. | 29/621.1 |
| 5,209,121 | 5/1993 | Hafner | 73/727 |

*Primary Examiner*—Donald O. Woodiel
*Attorney, Agent, or Firm*—Pandiscio & Pandiscio

[57] ABSTRACT

The invention improves upon the diaphragm/beam-type transducers and method of manufacturing same described in U.S. Pat. No. 4,368,575.

The new transducers and method of manufacture utilize strips or slivers of silicon or germanium which are larger than the individual strips used in the apparatus and method described in U.S. Pat. No. 4,368,575 by an amount sufficient to permit (a) the formation of two gages on each strip and (b) the forming of bonding pads on each gage. The bonding pads are formed on the gage strip before the strip is bonded to the beam, so that formation of the bonding pads and bonding of the strip to the beam can be handled automatically. The strips are mounted to one side of the midpoint of the beams, so that when a diaphragm/beam is deflected by application of a fluid pressure, one of the two gages will undergo a tension strain while the other gage will undergo a compression strain. Because both gages form part of the same silicon or germanium strip, they tend to be virtually identical in physical and electrical properties, thereby simplifying calibration of the resulting transducers.

30 Claims, 10 Drawing Sheets

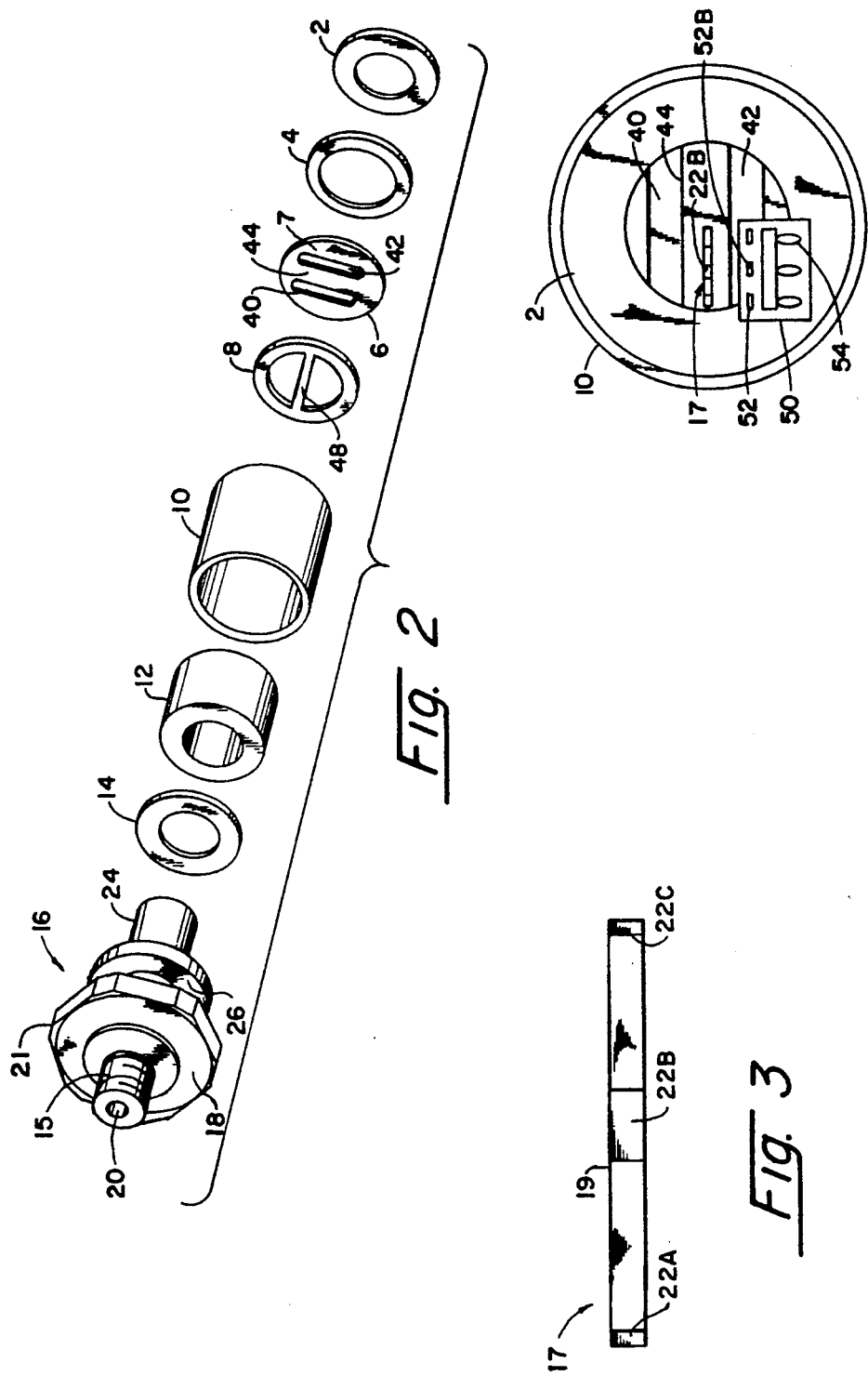

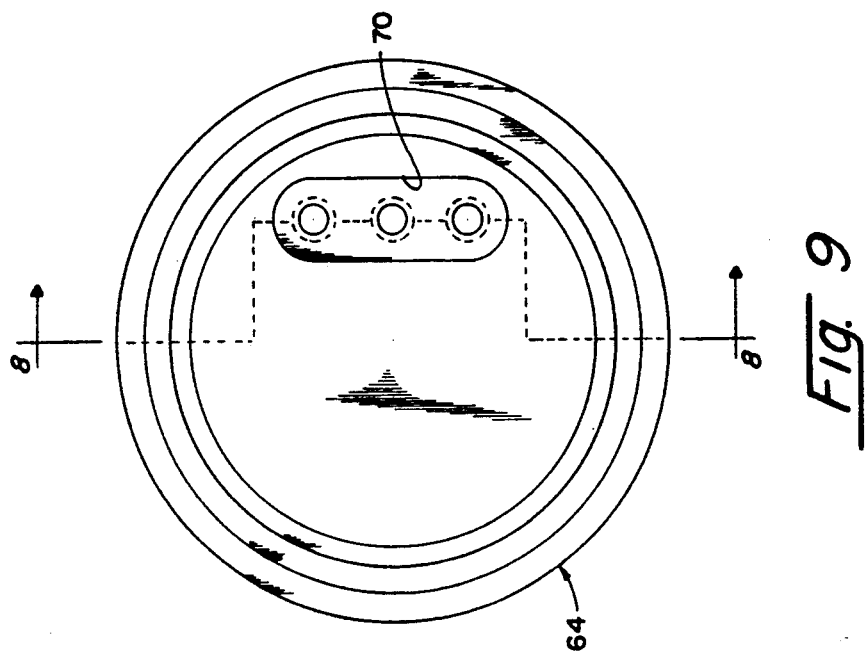
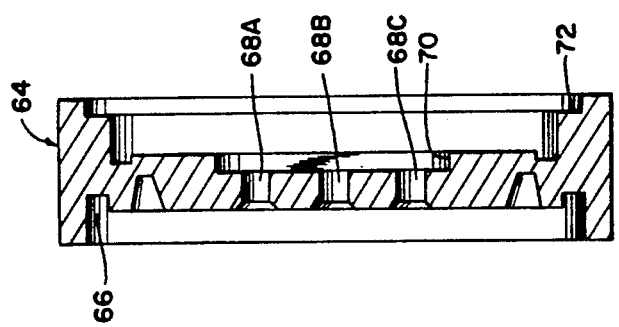

PRESSURE TRANSDUCERS

This is a divisional application of copending application Ser. No. 07/802,011, filed on Dec. 3, 1991, now U.S. Pat. No. 5,174,014, which in turn was a continuation of application Ser. No. 07/558,764 filed on Jul. 27, 1990, now abandoned.

This invention relates to the manufacture of pressure transducers and more particularly to an improved strain gage pressure transducer and an improved method of making same.

PRIOR ART

Strain gage transducers for measuring pressure or mechanical movements are well known, as exemplified by U.S. Pat. Nos. 3,611,367, 4,683,755, 4,793,194, 4,737,473, 4,577.052, 4,442,717 and 4,410,871, and the references cited therein. See, for example, the various forms of strain gage transducers disclosed in "Transducers Pressure and Temperature, 1974", published by National Semiconductor Corporation of Santa Clara, Calif.

An improved pressure transducer made from sheet materials of predetermined thicknesses is described in U.S. Pat. No. 4,327,350, issued Apr. 27, 1982 to Herman W. Erichsen for "Pressure Transducer". A further improvement in the art of making pressure transducers from sheet materials is described in U.S. Pat. No. 4,368,575, issued Jan. 18, 1983 to Herman W. Erichsen et al for "Pressure Transducer—Method of Making Same". Both of those patents disclose transducers comprising a diaphragm and a deflection beam that supports at least two strain gages or sensors and is adapted to deflect responsively when the diaphragm is flexed by changes in pressure. The strain gages or sensors respond so as to indicate the amount of flexing of the diaphragm.

The invention described in U.S. Pat. No. 4,368,575 has achieved commercial success. Nevertheless, it has been recognized that the manufacturing process described in U.S. Pat. No. 4,368,575 has some limitations. For one thing, the sensors are in the form of small elongate slivers of silicon or germanium that are bonded to the beam. Typically each sliver comprises a strain gage formed by diffusion Because of their relatively small size (typically 0.002–0.005" thick, about 0.10 inches long and about 0.005" wide), the slivers are difficult to handle and also present difficulties in the making of appropriate electrical circuit connections. Thus, it was found to be impractical to apply gold terminal pads to the slivers, and, in lieu thereof, gold leads are attached directly to the slivers. As a practical matter, the attachment of gold wire leads may be accomplished best by thermo-compression welding. However, this method of attaching leads to the strain gage slivers is time consuming and expensive, in part because of the size of the slivers and the wire leads.

Another limitation of the invention described in U.S. Pat. No. 4,638,575 concerns the non-uniformity of strain gage characteristics resulting from the use of several slivers of silicon or germanium to form the strain sensors.

Still another complication is the need to etch the silicon or germanium slivers to trim their electrical resistance. Such etching procedure typically involves etching one or more of the 0.002–0.005" thick silicon or germanium sliver to a thickness of about 0.0005". Obviously the etching operation is difficult to control and time-consuming.

Another even more troublesome limitation results from the need to bond the wire leads directly to the small slivers before they are attached to the beam. The wire leads tend to assume a random orientation. As a result, it is not practical to bond the leads to a circuit board by robotic means or other mechanical equipment. Therefore, prior to this invention the practice has been to manually bond the terminal leads to an associated cicuit board.

OBJECTS OF THE INVENTION

The primary object of this invention is to improve upon the pressure transducers and method of manufacturing same described in U.S. Pat. Nos. 4,327,350 and 4,368,575.

Another object is to provide pressure-sensing modules that constitute improvements over the modules disclosed in U.S. Pat. Nos. 4,327,350 and 4,368,575.

A further object of this invention is to provide new pressure sensing modules and pressure transducers that offer all of the advantages of devices of the type described in U.S. Pat. Nos. 4,327,350 and while offering economies of manufacture.

Still another object of this invention is to provide strain gage pressure-sensing modules, and transducers embodying same, provide better uniformity of strain gage characteristics.

A further object of the invention is to provide new beam-type strain gage pressure transducers adapted to respond to a predetermined range of fluid pressures.

Another more specific object is to provide new pressure-sensing modules and transducers, and methods of making same, that can be made with consistently high quality at relatively low cost.

A further specific object is to provide a method of manufacturing pressure transducers that takes advantage of relatively low cost manufacturing operations.

Still another object is to provide pressure-sensing modules and transducers in which a single piece of silicon or germanium is used to provide both compression and tension strain gage sensors.

The foregoing objects and advantages are achieved by a new method which utilizes strips or slivers of silicon or germanium which are larger than the individual strips used in the method described in U.S. Pat. No. 4,368,575 by an amount sufficient to permit (a) the formation of two gages on each strip and (b) the forming of bonding pads on each gage.

The bonding pads are bonded to the gage strip before the strip is bonded to the beam, so that formation of the bonding pads can be handled automatically, preferably using a suitable technique well known in the silicon processing art, e.g., vapor deposition or sputtering.

Described generally, in its preferred embodiment the method comprises the steps of:

(a) securing certain mechanical parts together by brazing and also by mechanical deformation or a suitable cement to form a mechanical sub-assembly which includes the beam and diaphragm;

(b) mounting a multi-gage strain gage unit, with bonding pads already provided, to the beam using a suitable bonding agent or cement, e.g., an epoxy resin, so as to form a non-hermetically sealed pressure sensing module;

(c) attaching an interface (interconnect or extender) board to one end of the mechanical sub-assembly, [using a suitable bonding agent or cement, e.g., an epoxy resin], with the board having a plurality of terminal pads;

(d) attaching wire leads between the bonding pads on the gage unit and a first set of terminal pads on the interface board;

(e) attaching additional wire leads to a second complementary set of terminal pads on the interface board, (f) passing the wire leads through a suitable header;

(g) attaching the header to the previously described mechanical sub-assembly so as to form an hermetically sealed pressure-sensing module.

The foregoing hermetically sealed pressure-sensing module is then tested by subjecting it to temperature and pressure cycling. This operation checks out the response of the diaphragm and beam to pressure variations, and also checks out the response of the two gages of the gage unit 17. Then the module is used to form a completed pressure transducer product having terminal means for connecting it to an exterior circuit. Formation of the completed transducer product may be accomplished by an assembly method comprising at least some of the following steps (h)-(m);

(h) mounting an input/output Wheatstone bridge circuit board to the module and connecting the wire leads that protrude from the header to input terminals on the input/output circuit board;

(i) connecting output lead wires to the output terminals on the input/output circuit board;

(j) trimming selected resistors of the bridge on the input/output circuit board based on data acquired from prior testing of the gage unit 17;

(k) surrounding a major portion of the sensing module with an exterior housing;

(l) securing the exterior housing to the sensing module; and (m) closing off the housing with a connector element.

Other aspects of the improved transducer and the new method are described in or rendered obvious by the following detailed description which is to be considered together with the accompanying drawings.

THE DRAWINGS

FIG. 2 is an exploded view of the assembly of FIG. 1;

FIG. 3 is a plan view illustrating a strain gage unit as employed in the present invention;

FIG. 5 is a schematic end view on an enlarged scale, looking from right to left in FIG. 2, illustrating the disposition of the connector board that is mounted to the assembly shown in FIGS. 1 and 2;

FIG. 8 is a sectional view in side elevation (taken along line 8—8 of FIG. 9) of the header (64) member used in the embodiment of FIGS. 1-7;

FIG. 9 is an end view of the same header member looking from right to left in FIG. 8;

Figure 1:
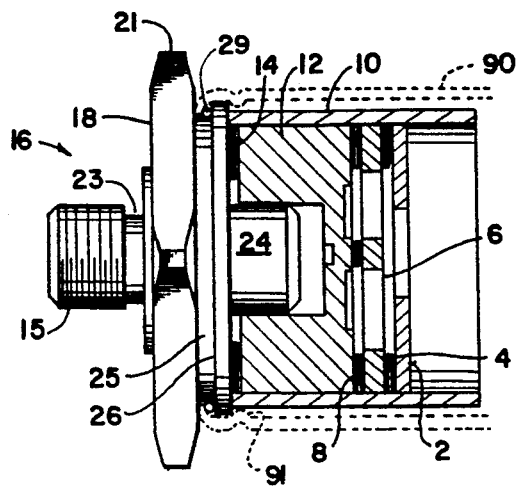
FIG. 1 is a longitudinal sectional view of a mechanical assembly constituting a non-hermetically sealed pressure-sensing module made according to a preferred embodiment of the invention.
Figure 12:
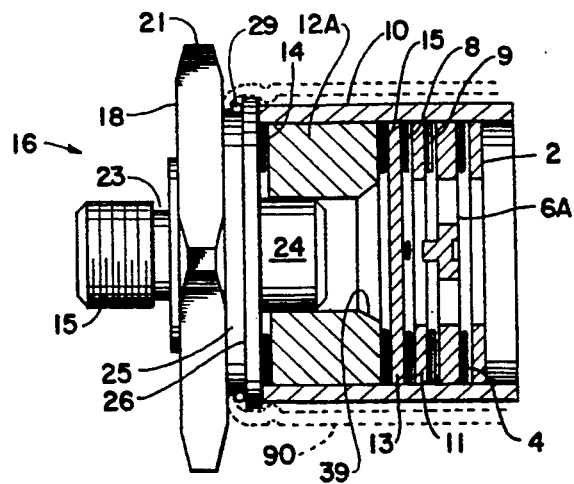
Figure 11:
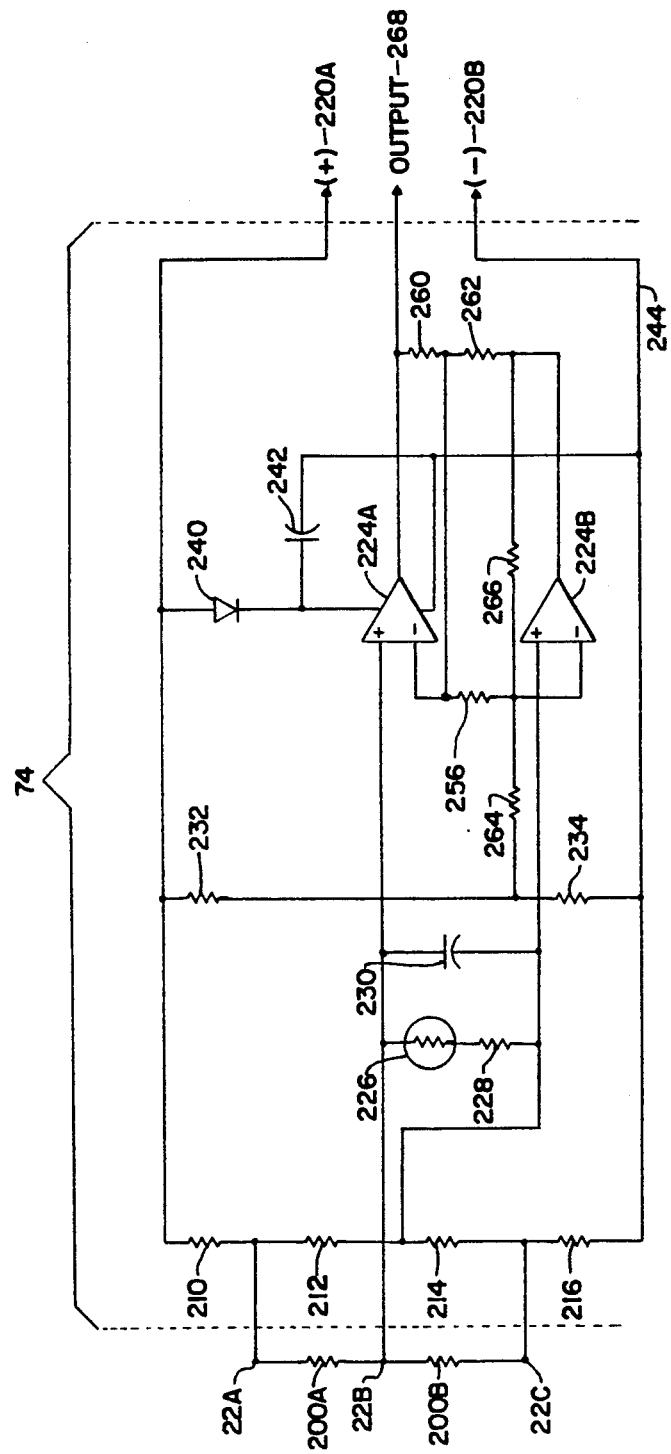
Figure 13:
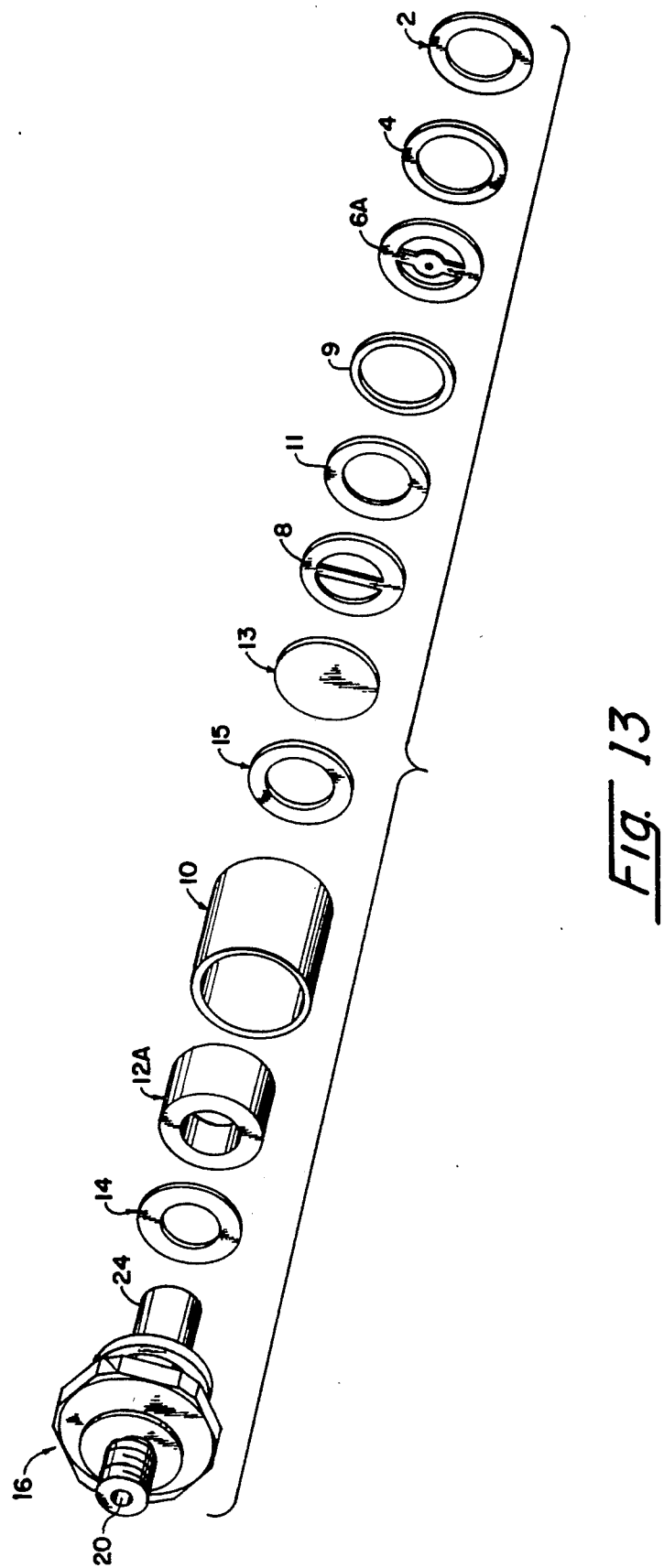
Figure 15:
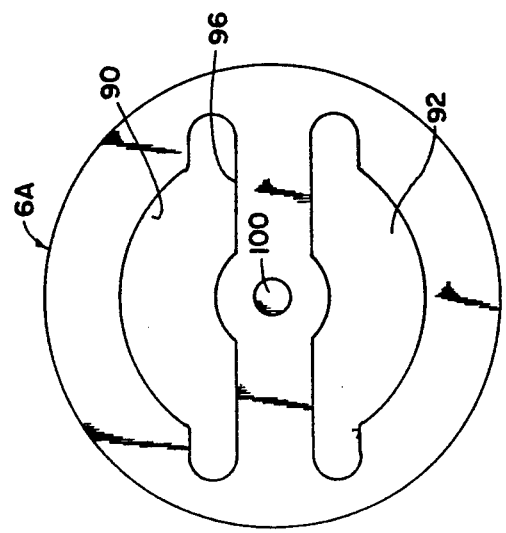
Figure 14:
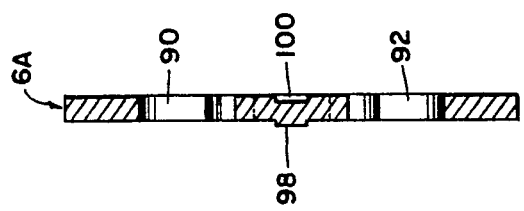
Figure 16:
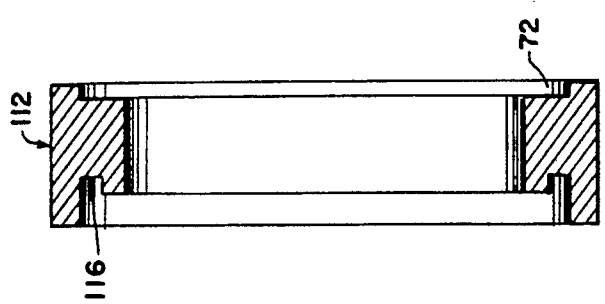
Figure 18:
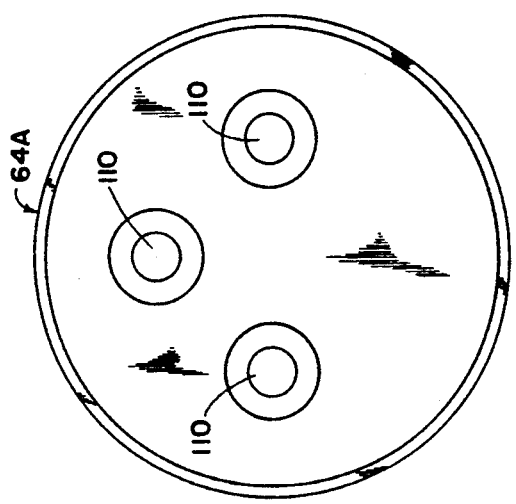
Figure 17:
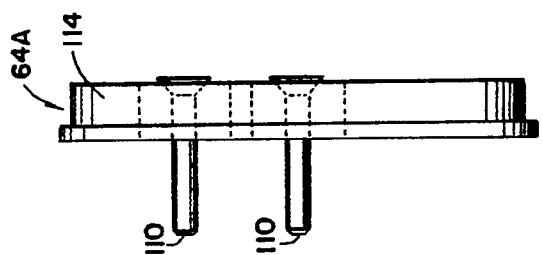

FIG. 11 schematically illustrates the bridge and amplifier circuit embodied in the input/output board;

FIG. 12 is a view like FIG. 1 of an alternative embodiment of the invention;

FIG. 13 is an exploded view like FIG. 2 of the same alternative embodiment of the invention;

FIG. 14 is a cross-sectional view of the beam element used in the alternative embodiment of the invention;

FIG. 15 is a rear view in elevation of the same beam element;

FIG. 16 is a cross-sectional view in side elevation of a spacer member employed in the alternative embodiment of the invention; and FIG. 17 is a side view in elevation of a header member used in the attendant embodiment;

FIG. 18 is a rear view in elevation of the header member shown in FIG. 17; and

Figure 7:
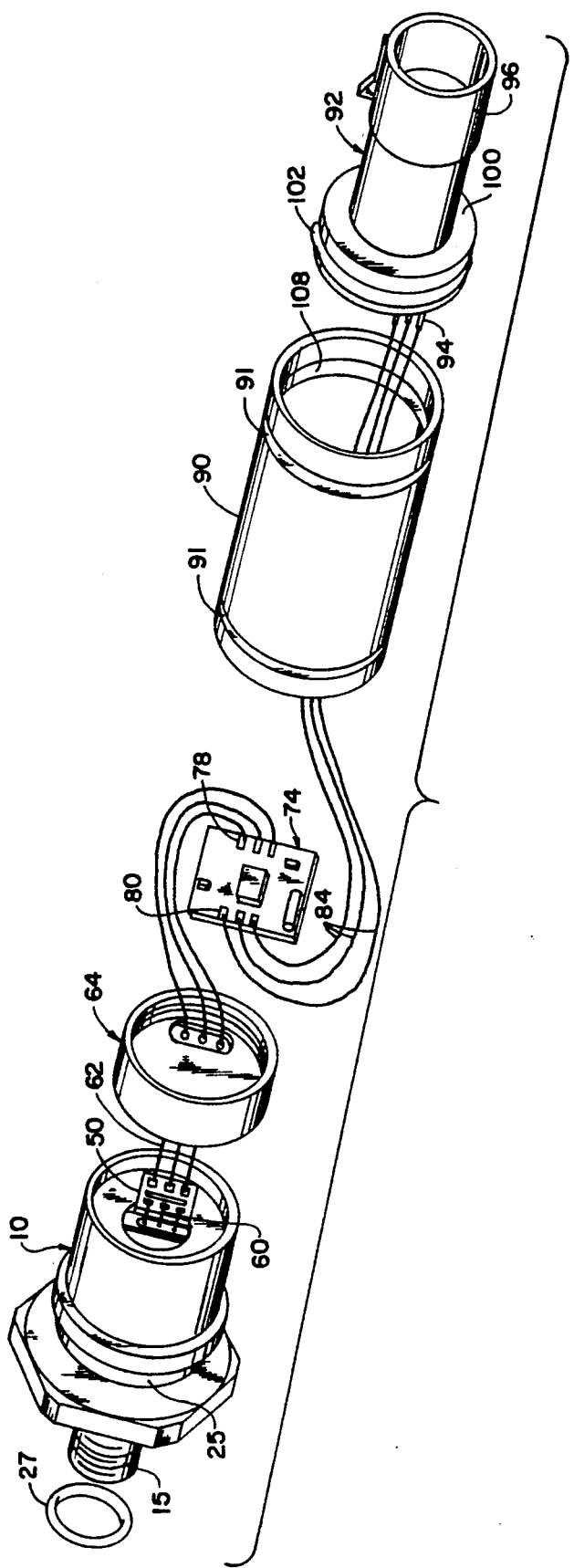
FIG. 7 is an exploded view of a completed transducer embodying the sensing module illustrated in FIGS. 1-6.
Figure 19:
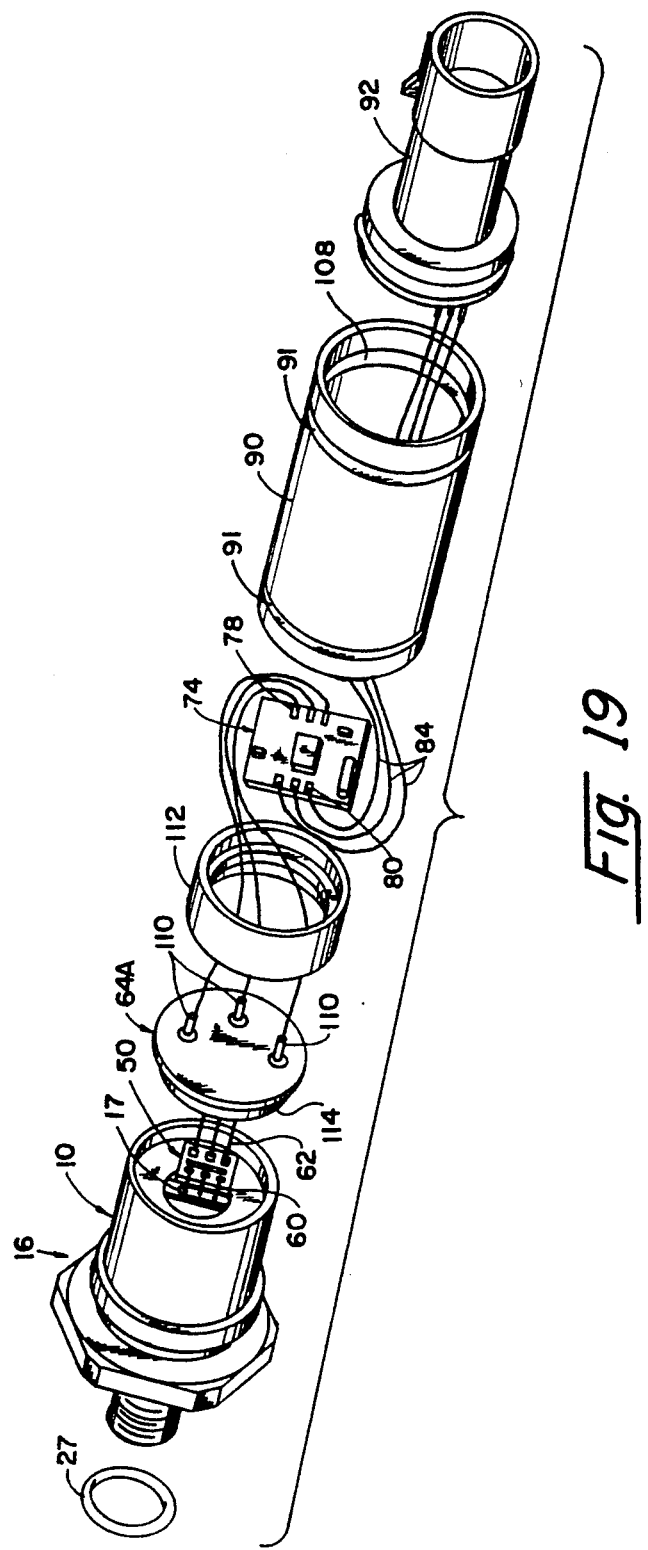

FIG. 19 is an exploded view like FIG. 7 of the alternative embodiment of the invention.

In the several figures, like numerals designate like parts. Also various figures are drawn to different scales to better illustrate and describe selected details of the invention.

PREFERRED EMBODIMENT OF THE INVENTION

FIGS. 1-10 illustrate a preferred embodiment of the present invention designed for measuring pressures above about 500 psi. This embodiment comprises a sensing module that comprises the components shown in FIGS. 1-4, plus a housing and other components illustrated in FIG. 5-10.

Referring now to FIGS. 1-5, there is shown a sensing module comprising a top ring or spacer 2, a braze preform in the shape of a circular ring 4, a beam unit 6, a beam braze preform in the shape of a circular ring 8, an inner cylindrical case 10, a diaphragm unit 12, a braze preform in the shape of a circular ring 14, and a port member 16, plus a strain gage unit 17 (FIG. 3). The strain gage unit 17 comprises an elongate narrow strip or sliver 19 of single crystal P-type silicon preferably having a <111> or an <110> orientation along its longitudinal axis, with the strip having a resistivity of 0.10 to 0.16 ohm-cm and less than 100 dislocations per $cm^2$, with an end to end gage resistance of about 700 to about 1000 ohms. Also it is preferred that the resistance balance between gage halves is within 3% of value. It is preferred that the strip have a thickness of about 0.0005" to 0.0015", with resistance being the governing factor as to the thickness of the strip. Preferably, but not necessarily, strip 19 has a length of approximately 0.205 inches and a width of approximately 0.01", as seen in FIG. 3. The strip is provided with metallized pads 22A-C which are suitable for ultrasonic wire bonding. The pads may be formed on the strip as islands spaced from the side and adjacent end edges of the strip, or, as shown in FIG. 3, they may extend across the full width of the strip. Preferably the metallized pads are formed by deposition of metal onto the silicon, and preferably the deposited metal is gold. It is preferred that the pads maintain ohmic contact with silicon over a wide range of temperature ranges. It is also preferred that the strip have smooth edges and also be free from microcracks as may be produced by cutting and/or chemical etching.

The components 2, 6, 10, 12 and 16 are all made of metal. Preferably they are made of stainless steel, but some other metal may be used to fabricate those parts. Preferably the preforms 4, 8 and 14 are made of a silver braze material that melts in the range of from 1300° F. to 1600° F. In practicing this invention, the brazing temperature (i.e., the temperature required to melt the brazing material well enough to accomplish brazing) can typically vary from the melting point to a temperature as much as 50° C. above the melting point.

Port member 16 has a through-bore 20 and comprises an exteriorily threaded extension 15 at one end for making a screw connection to a pressure-delivery member (not shown) that delivers a fluid whose pressure is to be measured into bore 20. A groove 23 may be provided in extension 15 to accommodate a resilient O-ring 27 (FIG. 7) to assure a tight sealed connection with the pressure-delivery member. Port member 16 also has an extension 24 at the other end which is designed to be inserted into the diaphragm unit 12, and a flange 26. Port 16 also has a second flange 18 having a polygonally-shaped edge surface 21, preferably of hexagonal configuration, for use in turning or holding the transducer when it is being connected by threaded extension 15 to the mating pressure-delivery member (not shown). A groove 25 separates flanges 18 and 26.

Figure 4:
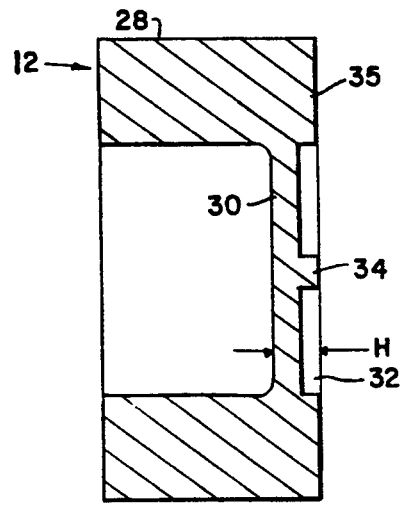
FIG. 4 is a sectional view in side elevation of the diaphragm unit of the assembly shown in FIGS. 1-3.

As seen best in FIGS. 1 and 4, the diaphragm unit 12 comprises a circular cylinder 28 that is closed off at one end by a diaphragm 30, with diaphragm 30 having a center post 34 formed integral with one side thereof. Diaphragm 30 has a relatively small thickness as compared to the wall thickness of cylinder 28. Preferably diaphragm 30 is formed by making diaphragm unit 12 with an end wall having a selected thickness H (FIG. 4), and machining an annular groove 32 in the outer face of that end wall so as to form the relatively thin diaphragm 30 and the circular center projection or post 34. Alternatively, diaphragm 30, groove 32 and post 34 may be formed by mechanically deforming the end wall of diaphragm unit 12, e.g., by a die-forming operation using a mechanical press. The internal diameter of cylinder 28 of the diaphragm member 12 is sized so as to make a close fit with extension 24 of port 16.

Braze preform 14 is sized so that it will slip over extension 24 of port member 16 and also make a close fit within inner case 10. The outer diameter of the cylinder portion 28 of diaphragm unit 12 is sized so that it will also make a close fit within inner case 10. Beam unit 6 is in the form of a circular disk and its outer diameter is sized so that it will make a close fit in inner case 10. Braze preforms 4 and 8 also have an outer diameter sized so as to make a close fit within inner case 10. Beam unit 6 is made with two parallel elongate holes 40 and 42 so as to form an elongate diametrically-extending beam 44 that is anchored at both ends by an annular beam support section 7. However, the effective length of beam 44 is determined by the i.d. of top ring 2, since the latter engages beam unit 6. Preform 8 has a diametrically extending narrow section 48. Beam unit 6 and braze preform 8 are oriented so that diametral section 48 extends at a right angle and in bisecting relation to beam 44, i.e., section 48 intersects the midpoint of beam 44 at a right angle.

The foregoing components are assembled in the order shown in FIGS. 1 and 2, so that braze preform 14 and diaphragm unit 12 fit over port extension 24, inner case 10 surrounds diaphragm unit 12 and preform 14 and engages flange 26. Braze preform 8 is disposed within inner case 10 in engagement with the peripheral shoulder portion 35 (FIG. 4) of diaphragm 12, while beam unit 6 is sandwiched between preforms 4 and 8 and oriented so that beam 44 extends at a right angle to the transversely-extending section 48 of preform 8 (see FIG. 2). Preform 4 engages the peripheral ring portion 7 of beam unit 6. The inner diameter of preform 4 is sized so that the braze element 4 will not overlap the ends of the elongate holes 40 and 42 in beam unit 6. The top ring or spacer 2 engages preform 4 and also fits within the inner case 10. The inner diameter of top ring 2 is smaller than the inner diameter of preforms 4 and 8. Once the components have been assembled in the manner shown in FIGS. 1 and 2, they are subjected to heat so as to cause the brazing elements 4, 8 and 14 to melt and fuse to the adjacent components, thereby forming an integrated non-hermetically sealed sensor assembly wherein inner case 10 is brazed to top ring 2, beam unit 6, diaphragm unit 12 and flange 26 of port member 16 by the fused preforms 4, 8 and 14.

Thereafter, a silicon strain gage unit 17 (see FIG. 3) is attached to beam 44. As shown in FIG. 5, the gage unit is mounted to one side of the center line of the beam 44 on the face thereof that faces away from the port 16.

The resulting sensor assembly is combined with other elements to form a hermetically sealed sensor module. This involves attaching an interconnect or interface board 50 to the top ring 2 (FIGS. 1, 5 and 7). Interface board 50 is attached to top ring 2 by suitable means, preferably by a cement such as a non-conductive epoxy resin. The side of board 50 that faces away from top ring 2 carries three electrically conductive input terminal pads 52 and three electrically conductive output terminal pads 54, with the corresponding ones of those tabs being interconnected by the board. Preferably pads 52 are aligned with pads 54, and the pads in each set are spaced from one another by approximately the same distance as the spacing between the pads 22A–C of gage unit 17. Accordingly, it is preferred that interface board 50 be attached to top ring 2 so that its three pads 52 are aligned with pads 22A–C respectively of the gage unit (FIG. 5).

Referring now to FIG. 7, the terminal pads 52 of interconnect board 50 are coupled to conductive pads 22A–C FIG. 3 of the gage unit by means of three individual wires 60. Three additional wires 62 are connected at one end to the three output terminal pads 54 on interconnect board 50.

Referring now to FIGS. 7–9, a header 64 is provided with a groove 66 at one side which is sized so as to receive and make a close fit with the adjacent end of inner case 10. Header unit 64 has three apertures 68A, B and C, which are aligned on a chord of a circle concentric with the header unit 64. The three wire leads 62 pass through holes 68A, B and C and are hermetically sealed therein by a suitable potting compound, e.g., an epoxy resin or a glass filled cement.

Header 64 is secured to case 10 by any suitable means capable of making a permanent hermetic seal, e.g., by a cement, soldering or welding. Preferably an epoxy resin is used to secure header 64 to case 10.

The resulting assembly is identified as a "moisture-sealed" pressure sensing module.

The side of the header opposite to the groove 66 has an elongate recess 70 that encompasses the apertures 68A, B and C. That same side of the header 64 has a counterbore so as to form a shelf 72 which is sized to accept and support an amplifier circuit board 74 (FIG. 7). The latter comprises a plurality of electronic components (described hereinafter in connection with FIG. 11), plus three conductive input terminal pads 78 and three conductive output terminal pads 80. Circuit board 74 is bonded to shelf 72 by means of a suitable cement, e.g., an epoxy resin.

Figure 6:
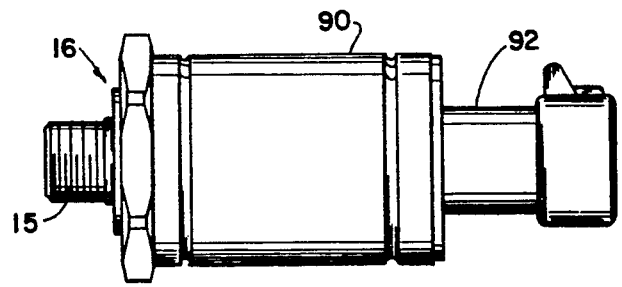
FIG. 6 is a side view in elevation of a completed transducer embodying the assembly illustrated in FIGS. 1-5.
Figure 10:
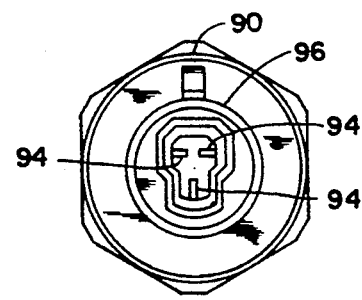
FIG. 10 is an end view of the completed transducer looking from right to left in FIG. 6.

The wire leads 62 are connected to the three input terminal tabs 78 on board 74. The three output terminal pads 80 of that board are connected to three wire leads 84. The finished pressure transducer also comprises an exterior cylindrical housing 90 (FIGS. 6 and 7). Housing 90 is formed with two corrugations 91 (FIG. 7) that provide interior ribs 108 at each end thereof. Housing 90 extends over inner housing 10 and is secured to port member 16. Housing 90 may be secured to port member 16 by various means. Preferably, as shown in dotted lines in FIG. 1, housing 90 is disposed so that one of its ribs 108 engages flange 26, and then it is secured in place by crimping, i.e., rolling its end by mechanical deformation over into the groove 25 between flanges 19 and 26. An O-ring 29 is preferably positioned in groove 25 before crimping, so as to assure that it will be compressed and make a tight seal with port member 16 when the end of housing is rolled over into groove 25.

Wire leads 84 extend into housing 90 and are connected to three conductive terminal pins 94 of a connector member 92. The latter is a female connector member, forming one half of a conventional connector of a type which is sold in the trade under the designation "Packard Metripak". Female connector member 92 comprises the three terminal pins 94 (FIGS. 7 and 10) which are insulated from one another, plus a hollow cylindrical extension 96 which is adapted to receive a complementary male connector member (not shown) adapted to make electrical connections with terminal pins 94 inside of extension 96. As seen in FIG. 7, connector member 92 includes a peripheral flange 100 having a groove in which is disposed an O-ring 102. Flange 100 is sized to make a close fit within housing 90, with flange 100 engaging the other rib 108. The O-ring 102 serves to make an hermetic seal between housing 90 and connector member 92. Connector member 92 may be cemented or brazed to the housing 90 so as to assure a permanent hermetic seal. Preferably, however, the adjacent end of exterior housing 90 is mechanically rolled over flange 100, so as to mechanically lock the housing and connector member together, with O-ring 102 assuring an hermetic seal.

Referring now to FIG. 11, the electrical components and connections presented by amplifier circuit board 74 are illustrated between the two vertical broken lines. The circuit shown in FIG. 11 comprises two strain gages or sensors 200A and 200B (corresponding to the two strain gage sensors existing in silicon strip 19 between pads 22A and 22B and between pads 22B and 22C). Strain gages 200A and 200B are connected into a voltage divider network comprising resistors 210, 212, 214 and 216. One end of strain gage 200A is connected by pad 22A to the junction of resistors 210 and 212. The opposite end of resistor 210 is connected to a positive excitation terminal 220A. The opposite end of strain gage unit 200B is connected by pad 22C to the junction of resistors 214 and 216. The opposite end of resistor 216 is connected to a negative excitation/output terminal 220B. The junction between strain gage units 200A and 200B is connected by pad 22B to the positive terminal of a first operational amplifier 224A. Additionally, a thermistor 226 and a resistor 228 are connected between pad 22B and the positive input terminal of a second operational amplifier 224B. A capacitor 230 is connected between pad 22B and the positive input terminal of operational amplifier 224B. An additional pair of resistors 232 and 234 are connected across the voltage divider network provided by resistors 210, 212, 214 and 216. A diode 240 is connected between terminal 220A and a control terminal of operational amplifier 224A. A second capacitor 242 is connected between that control terminal and a second control terminal of operational amplifier 224A. Capacitor 242 is also connected to the line 244 that connects the resistor 216 to the output/excitation terminal 220B.

Additionally, a resistor 256 is connected between the negative input terminal of operational amplifier 224A and the negative input terminal of operational amplifier 222B. Two additional resistors 260 and 262 are connected between the output terminals of operational amplifiers 224A and B. Two additional resistors 264 and 266 are connected between the junction of resistors 232 and 234 and the output terminal of amplifier 224B. The output terminal of amplifier 224A is connected to circuit output terminal 268. The junction of resistors 264 and 266 is connected to the negative input terminals of amplifiers 224A and 224B. Although not shown, it is to be understood that the terminals 220A, 220B and 268 are connected by wires 84 to pins 94 of connector member 92.

As is appreciated by persons skilled in the art, the circuitry shown in FIG. 11 comprises a Wheatstone bridge in the form of the two strain gage sensors 200A and 200B and the resistors 212 and 214, with the additional resistors and capacitors functioning to provide the proper voltage between resistors 210 and 212 on the one hand and between resistors 214 and 216 on the other hand, and to provide an accurate output signal in response to changes in the fluid pressure applied to the transducer. A d.c. excitation signal is applied between terminals 220A and 220B and the output signal is taken between terminals 268 and 220B.

The amplifier unit shown in FIG. 11 offers the advantage that it is ratiometric; if the voltage applied across terminals 220A and 220B increases, the output voltage at terminal 268 increases ratiometrically. In practice, the output voltage of the transducer is commonly coupled to an analog-to-digital converter, thereby allowing the transducer to serve as an input signal source for a digital microprocessor or controller. The capacitors 230 and 242 serve to control the response time of the unit.

The apparatus shown in FIGS. 1–11 is manufactured according to the following method:

The components shown in FIG. 1 are assembled together in the manner shown in FIG. 2, and thereafter the assembled components are heated so as to cause the preforms 4, 8 and 14 to melt and thereby braze together the components that are contacted by those braze preforms. Thereafter, gage unit 17 (FIG. 3) is bonded to the beam 44 by means of a suitable cement, preferably a non-conductive epoxy resin (an epoxy resin is a thermosetting material). The gage unit is mounted on the side of the beam that faces away from the port 16, and also is located to one side of the midpoint of beam 44, as shown in FIG. 5. Thereafter, the interconnect board 50 is cemented to the top ring 2 by a suitable cement, e.g., an epoxy resin, so that it lies to one side of the center line of beam 44 in alignment with the gage unit. Preferably, but not necessarily, the interconnect board 50 is positioned so that its center pad 52B is aligned with the center pad 22B of the gage unit. The foregoing assembly is then heated to a suitable temperature for a selected time, e.g., to about 300° F. for about two hours, so as to cure the epoxy resin, and thereby assure a permanent connection between strain gage unit 17 and beam 44 and the interconnect board 50 and top ring 2. It is to be appreciated that interconnect board 50 is mounted on the side of top ring 2 that faces away from port 16.

Thereafter, the three wire leads 60 are bonded to the pads 22A-C of the gage unit, and also to the three input pads 52 of interconnect board 50. Next, three wire leads 62 are attached to the three output pads 54 of board 50. Those interconnections, like the interconnections to strain gage pads 22A-C and the three input pads 52, are made preferably by compression bonding using gold leads. The three wire leads 62 are passed through the openings 68A, B and C of header member 64. The header member is then attached to the inner housing 10, with the inner housing 10 fitting into the groove 66. The header unit 64 may be secured to the inner housing 10 by brazing or solder, but preferably by a suitable cement, e.g., an epoxy resin. Once that has been done, a suitable potting compound, e.g., an epoxy resin, is introduced into the openings 68A, B and C so as to provide an hermetic seal between header 64 and the three wire leads 62. At this point the port 16, inner housing 10 and header 64 form an hermetically sealed sensor assembly.

Still referring to FIGS. 1-7, the three wire leads 62 are then attached to the three input conductive terminal pads 78 of input/output circuit board 74, and then the latter board 74 is positioned in the header unit 64 in engagement with the shoulder 72. Input/output board 74 is secured to the header unit by means of an epoxy resin which bonds the amplifier board to the shoulder 72. Thereafter, three additional wires 84 are bonded to the three conductive output pads 80 of board 74. The three leads 84 are passed through the outer housing 90. Then the outer housing 90 is slipped over the header member 64 and flange 26 of port member 16, and secured to the latter by rolling its end over into the space between flanges 19 and 26. Preferably an O-ring 29 is located in groove 25 and the end of housing 90 is crimped over the O-ring so as to asssure a high quality hermetic seal. Then the three wire leads 84 are attached to the three terminal pins 94 of connector member 92, after which the connector member 92 is inserted into the opposite end of housing 90, and attached thereto by mechanically rolling the adjacent end of housing 90 over flange 100 of connector member 92 as previously discussed.

Preferably, the foregoing method of assembly is interrupted by two testing steps. In the first step, the non-hermetically sealed module is tested by connecting the three leads 60 (or 62) to suitable test apparatus. In that second testing step, the three lead wires 84 are connected to suitable test apparatus. The transducer is calibrated (before assembly of exterior housing 90) by laser trimming the resistors 210, 212, 214, 216, 250, 260 and 264.

ALTERNATIVE EMBODIMENT OF THE INVENTION

FIGS. 12 to 19 show a device designed to operate at a pressure in the range of about 100 psi to about 500 psi. Unless otherwise specified, the elements, parts or features shown in FIGS. 12 to 19 are identical or similar to parts shown in FIGS. 1-11 or described in relation to the embodiment shown in FIGS. 1-11.

In this case, the sensing module comprises top spacer ring 2, a beam/post member 6A, a spacer ring 11, a diaphragm support 12A, a diaphragm 13, inner case 10, port member 16, and annular braze preforms 4, 8, 9, 14 and 15. The alternative embodiment illustrated in FIGS. 12 to 19 differs from the preferred embodiment described above and illustrated in FIGS. 1-11 in that it comprises, in place of diaphragm unit 12 and the beam unit 6 previously described, a beam/post unit 6A, a spacer ring 11, a diaphragm support 12A, and diaphragm member 13, plus additional braze preforms 9 and 15. Preferably parts 6A, 11, 12A and 13 are made of the same material as port member 16.

The beam/post unit 6A is illustrated in cross-section in FIGS. 14 and 15. It essentially comprises a circular disc having two elongate, partly arcuate holes 90 and 92 formed therein so as to form a diametrically extending beam 96. The latter is formed with a post in the form of a protrusion or projection 98 on one side. In this particular configuration, the member 6A may be formed by a metal stamping procedure, so that formation of post 98 is accompanied by formation of a cavity 100 on the opposite side of beam 96.

The diaphragm 13 is essentially a circular metal disk with a thickness that permits it to flex when subjected to fluid pressures within a predetermined range, e.g., 0-100 or 0-500 psi.

The diaphragm support 12A is essentially a cylindrical tube having an o.d. sized to make a snug fit in inner case 10. The i.d. of diaphragm support 12A is sized to accept and make a close fit with extension 24 of port member 16. Preferably, but not necessarily, the center hole of support 12a is chamfered as shown at 39 on the side facing diaphragm 13. The center hole of support 12A serves to transmit the fluid pressure applied via port member 16 to diaphragm 13. Spacer ring 11 and diaphragm support 12A, when brazed together by braze preforms 8 and 15, act to provide a rigid support for an annular marginal portion of diaphragm disk 13. The effective fluid pressure-responsive area of diaphragm 13 is determined by the i.d. of spacer ring 11.

The alternative embodiment shown in FIGS. 12 to 19 is assembled in essentially the same manner as the product shown in FIGS. 1-11. The components shown in FIG. 12 are assembled together in stacked or surrounding relation to one another, with the components 2, 4, 6A, 9, 11, 8, 13, 15, 12A and 14 all fitting over the extended post section 24 of port member 16 and fitting within the inside case 10. These components are brazed together by heating the assembly of components together at a suitable temperature for a selected period of time. The portion of diaphragm 13 located inwardly of spacer ring 11 is free to flex toward and away from diaphragm support 12A in response to changes in fluid pressure applied through center hole 39.

Thereafter, (as shown in FIG. 19) that sub-assembly is secured to strain gage unit 17 and an interconnect board 50 as previously described, and the strain gage unit and interconnect board are connected by leads 60 as previously described.

In this alternative embodiment a header unit 64A and a spacer ring 112 are used (see FIG. 19). Header 64A has three electrically insulated pins 110. These pins are connected by three wires 62 that pass through spacer ring 112 and are attached to the three input pads 78 on input/output board 74. Three wires 84 connect the three output terminal pads 80 of circuit board 74 to connector member 92 as previously described. Header 64A is designed to mate with inner case 10. It has a reduced diameter section 114 which is sized so as to fit within and make a close fit in the adjacent end of inner case 10. Spacer ring 112 has a groove 116 at one end that is sized so as to receive and make a close fit with the adjacent end of inner case 10. It also has a counterbore that forms a shelf 72 which is sized to accept and support circuit board 74. Header 64A and spacer ring 112 are secured to inner case 10 by brazing or a suitable cement.

Once the components shown in FIGS. 12-18 have been secured together to form an integral sub-assembly, the additional components shown in FIG. 19 are attached in the manner previously described so as to form an hermetically sealed transducer product having all of the advantages of the present invention. Testing is conducted as described previously in connection within FIGS. 1-11.

An important advantage of this invention resides in the use of a semiconductor sliver that is processed so as to provide two strain gage sensors, with the sliver being arranged so that one sensor responds in tension and the other sensor responds in compression. Because both sensors are formed in a common sliver, their physical properties match and hence it is not necessary to trim either sensor in order to achieve balanced responses. Instead relatively easy trimming of selected discrete resistors on the amplifier board 74 is all that is required to properly calibrate the transducer. Such trimming is less costly to conduct than trimming of the strain gages, and also may be done more rapidly and conveniently.

Another advantage is that top ring 2 serves to delineate the exact length of beams 44 or 96. The i.d. of ring 2 determines the active portion of the beam that responds to deflection. Hence the effective length of beams 44 or 96 can be varied by changing the i.d. of ring 2.

Still another advantage is that the pressure range of the device can be varied by changing the thickness of beams 44 and 96 diaphragms 30 and 13, respectively with a higher pressure range requiring thicker and hence stiffer beams and diaphragms.

Obviously the invention may be practiced otherwise than as specifically described and illustrated by the drawings. Thus, the method and order of assembling and bonding components may be varied, depending, for example, on the materials of which the components are made and the specific geometric form and location of the components. Thus, extender board 50 may be mounted to top ring 2 by an epoxy cement after curing of the epoxy cement used to bond gage unit 17 to beam 44, or curing of the epoxy cement holding gage unit 17 to beam 44 may be carried out simultaneously with curing of the epoxy cement that holds extender board 50 in place. Also the outer case 90 need not be secured to port member 16 and connector member 92 by mechanical rolling; instead brazing or a suitable cement could be used to form an hermetic connection between housing 90 and the port and connector members. Also another form of connector member may be used in place of the connector member shown at 92. It also is contemplated that the gage unit shown in the drawings may be augmented by a second gage unit mounted on the opposite side of the beam or on the same side of the beam but to the other side of its midpoint. Still other modifications that do not depart from the principles of the invention will be obvious to persons skilled in the art.

Furthermore, it is to be understood that the following claims are intended to cover both the sub-assemblies of FIGS. 1 and 12, and also the total assemblies of FIGS. 6, 7 and 19, and equivalents thereof.

What is claimed is:

1. A pressure sensing module comprising:
   a casing;
   a diaphragm disposed within said casing;
   beam means disposed within said casing comprising a beam having first and second opposite ends, said beam extending in a plane parallel to the plane of said diaphragm;
   means disposed within said casing supporting said diaphragm and said beam means so that said beam extends transversely of and is spaced from said diaphragm;
   force-transmitting means extending between said beam and said diaphragm so that said beam will deflect responsively when said diaphragm is deflected;
   said casing providing a pressure receiving chamber within which said diaphragm, said beam and said force transmitting means are disposed;
   a pressure-transmitting port member attached to one end of said casing for delivering a fluid to said chamber when pressure is to be measured;
   a strain gage unit comprising a sliver of a semiconductor material attached to said beam and defining at least first and second strain gage sensors, said sliver being located to one side of the mid-point of said beam; and
   signal-transmitting means connected to first and second strain gage sensors for transmitting a signal indicative of (1) a deflection of said beam when it deflects in a first direction and a (2) deflection of said beam when it deflects in a second opposite direction.

2. Apparatus according to claim 1 wherein said strain gage unit comprises first, second and third terminal pads on said sliver spaced from one another so that said first and second terminal pads serve as terminals for said first strain gage sensor and said second and third pads serve as terminals for said second strain gage sensor.

3. Apparatus according to claim 1 wherein said beam extends along a diameter of said diaphragm.

4. Apparatus according to claim 1 wherein said force-transmitting member is formed integral with said diaphragm.

5. Apparatus according to claim 4 wherein said force-transmitting means comprises an integrally-formed protrusion on said diaphragm.

6. Apparatus according to claim 4 wherein said diaphragm is a flat member.

7. Apparatus according to claim 1 wherein said beam means comprises a circular disk having openings therein defining a diametrically-extending beam.

8. Apparatus according to claim 1 wherein said force-transmitting means comprises an integrally-formed protrusion on said beam in position to engage said diaphragm at substantially its center region.

9. Apparatus according to claim 1 wherein at least some of said means are secured together by braze preforms that are sandwiched between said at least some means.

10. Apparatus according to claim 9 comprising a braze preform in the shape of a ring having a diametrically-extending rib, said braze preform being located between said diaphragm and said beam.

11. Apparatus according to claim 10 wherein said rib is oriented so as to extend at a right angle to said beam.

12. Apparatus according to claim 1 wherein said port member is brazed to said diaphragm, said casing, and to at least one of said means.

13. Apparatus according to claim 1 wherein said diaphragm comprises part of a member that supports said diaphragm and is disposed within said casing.

14. Apparatus according to claim 1 wherein said strain gage unit comprises a single sliver of a semiconductor material from the class consisting of silicon and germanium.

15. Apparatus according to claim 14 wherein said semiconductor material is silicon.

16. Apparatus according to claim 14 wherein said semiconductor material is germanium.

17. Apparatus according to claim 1 wherein said beam is part of a silicon component.

18. Apparatus according to claim 1 further including a housing surrounding said casing.

19. Apparatus according to claim 1 wherein said diaphragm is an integral part of a diaphragm unit that also comprises a cylindrical diaphragm support.

20. Apparatus according to claim 1 wherein said strain gage unit is mounted on said beam on a side thereof that faces away from said port member.

21. Apparatus according to claim 2 wherein said first and third terminal pads are located at the opposite ends of said sliver, and said second terminal pad is located centrally between said opposite ends.

22. Apparatus according to claim 1 wherein said strain gage unit includes first, second and third terminal pads, and further including means attached to said first, second and third terminal pads for coupling electrical signals from said strain gage unit to an exterior circuit.

23. Apparatus according to claim 1 wherein said casing surrounds said diaphragm, said beam means, said force-transmitting means, and at least part of said port member.

24. Apparatus according to claim 1 wherein said strain gage unit is a sliver of silicon having an overall thickness in the range of 0.0005 and 0.0015.

25. Apparatus according to claim 1 wherein said strain gage unit is a sliver of silicon having a width in the order to about 0.010" and a length in the order of about 0.205".

26. A pressure transducer comprising the pressure sensing module of claim 1 and an outer housing secured to said casing, an input/output circuit board mounted within said housing, and electrically conductive means connecting said strain gage unit to said input/output circuit board.

27. Apparatus according to claim 26 wherein said input/output circuit board comprises a Wheatstone bridge circuit.

28. The pressure transducer of claim 26 wherein said outer housing is crimped to a portion of said port member.

29. A pressure transducer comprising:
a port member for delivering a fluid to said pressure transducer for purposes of pressure measurement;
an outer housing surrounding and mechanically secured to a portion of said port member;
a casing within said outer housing, said casing being secured to said port member;
a diaphragm unit secured within said casing in fixed relation to said port member;
said diaphragm unit comprising a diaphragm extending in a plane normal to said casing and a cylindrical member supporting said diaphragm within said casing;
a beam carrying element disposed within said casing comprising a circular disk having openings therein defining a beam extending in a plane parallel to the plane of said diaphragm;
means disposed within said casing supporting said diaphragm and said beam carrying element so that said beam extends transversely of and is spaced from said diaphragm;
a force-transmitting member formed integral with and as a protrusion on said diagram, said force-transmitting member extending between said diaphragm and said beam so that said beam will deflect responsively when said diaphragm is deflected;
said casing providing a pressure receiving chamber connecting said diaphragm unit and said port member;
a strain gage unit comprising a sliver of a semiconductor material attached to said beam and defining at least first and second strain gage sensors, said sliver being located to one side of the mid-point of said beam;
signal-transmitting means connected to first and second strain gage sensors for transmitting a signal indicative of (1) a deflection of said beam when it deflects in a first direction and a (2) deflection of said beam when it deflects in a second opposite direction;
an input/output circuit board mounted within said housing; and
means connecting said strain gage unit to said input/output board.

30. A pressure transducer comprising:
a port member for delivering a fluid to said pressure transducer for purposes of pressure measurement;
an outer housing surrounding and mechanically secured to a portion of said port member;
a casing within said outer housing, said casing being secured to said port member;
a diaphragm unit disposed within said casing and affixed to a portion of said port member;
said diaphragm unit comprising a diaphragm extending in a plane normal to said casing and a cylindrical member affixed to and supporting said diaphragm within said casing;
a beam carrying element disposed within said casing comprising a circular disk having openings therein defining a beam extending in a plane parallel to the plane of said diaphragm;
means disposed within said casing supporting said diaphragm and said beam carrying element so that said beam extends transversely of and is spaced from said diaphragm;
a force-transmitting member formed integral with and as a protrusion on said beam, said force-transmitting member extending between said beam and said diaphragm so that said beam will deflect responsively when said diaphragm is deflected;
said casing providing a pressure receiving chamber connecting said diaphragm unit and said port member;
a strain gage unit comprising a sliver of a semiconductor material attached to said beam and defining at least first and second strain gage sensors, said sliver being located to one side of the mid-point of said beam;

signal-transmitting means connected to first and second strain gage sensors for transmitting a signal indicative of (1) a deflection of said beam when it deflects in a first direction and a (2) deflection of said beam when it deflects in a second opposite direction;

an input/output circuit board mounted within said housing; and means connecting said strain gage unit to said input/output board.

* * * * *

UNITED STATES PATENT AND TRADEMARK OFFICE
CERTIFICATE OF CORRECTION

PATENT NO. : 5,317,923
DATED : June 7, 1994
INVENTOR(S) : Herman W. Erichsen et al It is certified that error appears in the above-indentified patent and that said Letters Patent is hereby corrected as shown below:

Claim 1, column 12, line 33, change "a (2)" to -- (2) a --;

Claim 29, column 14, line 12, change "diagram" to -- diaphragm --;

Claim 29, column 14, line 28, change "a (2)" to -- (2) a --;

Claim 30, column 15, line 4, change "a (2)" to -- (2) a --.

Signed and Sealed this

Sixth Day of September, 1994

Attest:

BRUCE LEHMAN

*Attesting Officer*     *Commissioner of Patents and Trademarks*